(12) United States Patent
Prouzet (10) Patent No.: US 11,339,843 B2
(45) Date of Patent: May 24, 2022

(54) BRAKE ASSEMBLY INDICATOR (71) Applicant: Ratier-Figeac SAS, Figeac (FR)

(72) Inventor: Bertrand Prouzet, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 16/055,567

(22) Filed: Aug. 6, 2018

(65) Prior Publication Data

US 2019/0136928 A1 May 9, 2019

(30) Foreign Application Priority Data

Nov. 6, 2017 (EP) ..................................... 17306529

(51) Int. Cl.
*F16D 66/02* (2006.01)
*F16D 65/12* (2006.01)
*B60T 17/22* (2006.01)

(52) U.S. Cl.
CPC .......... *F16D 66/028* (2013.01); *F16D 65/12* (2013.01); *F16D 66/02* (2013.01); *F16D 66/025* (2013.01); *B60T 17/22* (2013.01)

(58) Field of Classification Search
CPC ...... F16D 66/025; F16D 66/028; F16D 65/12; F16D 66/02; B60T 17/22
See application file for complete search history.

(56) References Cited

U.S. PATENT DOCUMENTS

| 3,091,310 A | * | 5/1963 | Smith | ..................... F16D 65/54 |
| | | | | 188/196 P |
| 3,580,366 A | * | 5/1971 | Plaat | ....................... F16D 65/54 |
| | | | | 188/196 P |
| 6,003,640 A | * | 12/1999 | Ralea | ..................... B60T 8/1703 |
| | | | | 188/1.11 L |
| 6,135,242 A | * | 10/2000 | Hockley | ................. F16D 66/00 |
| | | | | 188/1.11 R |

(Continued)

FOREIGN PATENT DOCUMENTS

| DE | 2734786 A1 | 2/1979 |
| JP | S50138044 U | 11/1975 |
| WO | 0020320 A1 | 4/2000 |

OTHER PUBLICATIONS

Extended European Search Report for International Application No. 17306529.3 dated May 8, 2018, 8 pages.

(Continued)

*Primary Examiner* — Bradley T King
*Assistant Examiner* — James K Hsiao
(74) *Attorney, Agent, or Firm* — Cantor Colburn LLP (57) ABSTRACT

A brake component indicator configured to provide a visual indication of the release state of the brake component; the indicator comprising an indicator element connected to the brake component and moveable with the component during a braking operation, whereby the indicator element is provided with means to provide a visual indication of the direction and/or the distance moved by the indicator element during the braking operation. Preferably, the indicator ele- (Continued)

ment is in the form of a rod connected to a brake disk or pad that engages a moving part in a braking operation to brake the moving part, the rod provided with indicator means whose position is an indication of the distance the brake disk or pad has traveled to engage the moving part.

1 Claim, 6 Drawing Sheets

(56) References Cited

U.S. PATENT DOCUMENTS

| | | | | |
|---|---|---|---|---|
| 6,352,137 | B1* | 3/2002 | Stegall | F16D 65/28 188/1.11 E |
| 6,460,659 | B1* | 10/2002 | Schaffer | F16D 66/02 188/1.11 R |
| 6,637,262 | B2* | 10/2003 | Chang | G01L 5/28 188/11 |
| 7,104,365 | B1* | 9/2006 | Murphy | F16D 66/028 188/1.11 W |
| 7,673,721 | B2 | 3/2010 | Bailey et al. | |
| 7,963,373 | B2* | 6/2011 | Salazar | F16D 66/00 188/1.11 R |
| 8,181,752 | B2* | 5/2012 | Philpott | F16D 55/227 188/72.9 |
| 8,634,971 | B2 | 1/2014 | Cahill | |
| 8,717,159 | B2 | 5/2014 | Todd et al. | |
| 8,827,046 | B2 | 9/2014 | Cahill | |
| 9,441,692 | B2* | 9/2016 | Schaefer | F16D 66/025 |
| 9,482,301 | B2 | 11/2016 | Lamkin et al. | |
| 10,119,873 | B2* | 11/2018 | Finch, Jr. | G01L 5/28 |
| 2003/0121732 | A1* | 7/2003 | Miller | F16D 66/028 188/1.11 W |
| 2004/0206584 | A1* | 10/2004 | Bihn | F16D 66/02 188/1.11 L |
| 2005/0258006 | A1* | 11/2005 | Plantan | F16D 65/183 188/1.11 R |
| 2007/0131492 | A1* | 6/2007 | Cory | F16D 66/024 188/1.11 L |
| 2010/0206671 | A1* | 8/2010 | Cahill | F16D 66/026 188/1.11 L |
| 2014/0144367 | A1* | 5/2014 | Gaufin | F16D 66/02 116/28 R |
| 2016/0281808 | A1* | 9/2016 | Lamkin | F16D 55/38 |
| 2016/0305499 | A1* | 10/2016 | Troester | F16D 66/02 |
| 2017/0146084 | A1 | 5/2017 | Drewes et al. | |
| 2019/0136927 | A1* | 5/2019 | Prouzet | F16D 66/023 |

OTHER PUBLICATIONS

EPO Official Letter for Application No. 17306529.3, dated Dec. 17, 2020, 4 pages.

* cited by examiner

BRAKE ASSEMBLY INDICATOR

FOREIGN PRIORITY

This application claims priority to European Patent Application No. 17306529.3 filed Nov. 6, 2017, the entire contents of which is incorporated herein by reference.

TECHNICAL FIELD

The present disclosure is concerned with an arrangement for providing a visual indication of the release state of a brake system.

BACKGROUND

Brake systems such as found on vehicles and the like generally comprise a brake rotor disk that rotates with the wheel or component to be braked, and a brake calliper fixed relative to the rotor disk. To brake rotation of the wheel or the like, usually in response to actuation of a lever, the calliper presses or squeezes the brake disk to slow or prevent its further rotation. Such brake systems are also found in helicopters for braking rotation of the helicopter rotor.

Often, sparks, dust or debris are created during the braking operation due, e.g. to friction between the brake system materials.

To prevent sparks and dust generated by braking from spreading, a retaining cover or box is placed around the brake system e.g. in the form of a shroud or case enclosing the brake disk, brake calliper and other brake system components. At appropriate maintenance intervals, the dust box can be removed, e.g. by unscrewing nuts/fasteners that secure the box around the brake system, so the inside of the box can then be emptied/cleaned.

When a brake is desired to be released, it is important for the pilot/crew to know that the brake disks have properly disengaged and have not, e.g. stuck or jammed. In conventional systems, electric sensors are provided to monitor release of the brake pads/disks. Electrical devices may, however generate faulty outputs, or fail, for example indicating that the pads are engaged when, in fact, they are not, or vice versa.

In situations where the brake components are in locations that are difficult to access and/or are located within a dust box, it is difficult to check the brake components for wear and/or to check if the brake is truly released. If a dust box is provided around the brake assembly, the dust box has to be removed to ascertain how worn the brake components are. This can be difficult and time consuming and can sometimes require special tools or skills.

If electric brake release sensors fail or are unreliable or inaccurate, it may be necessary to cancel a flight if the true state of the brake is uncertain.

The present disclosure aims to provide an arrangement for providing a visual indication of the release state, and, possibly, also the state of wear of components of a brake system, that overcomes or reduces the above problems.

SUMMARY

According to this disclosure there is provided a brake component indicator configured to provide a visual indication of a release state of the brake component; the indicator comprising an indicator element connected to the brake component and moveable with the component during a braking operation, whereby the indicator element is provided with means to provide a visual indication of the direction and/or the distance moved by the indicator element to engage the brake component in the braking operation.

Preferably, the indicator element is in the form of a rod connected to a brake disk or pad that engages a moving part in a braking operation to brake the moving part, the rod provided with a marking whose position is an indication of the distance the brake disk or pad has traveled to engage the moving part.

The marking can be e.g. a colour marking or a pattern or groove or the like machined into the rod.

In another embodiment, the visual indication can be provided by means of a rack machined onto an indicator rod, with a spur gear connected to the rack. A visual indicator e.g. a needle, disk etc. can be fixed onto the spur gear. Rod movement is translated to an amplified movement of the disk, needle etc. to provide a clear, simple and reliable visual check. In an alternative embodiment, the indicator rod can be connected to a push/pull cable which can, in turn, actuate a remote visual indicator e.g. in a cockpit or control room or centre.

The indicator element may be moveably mounted in a window element such that the visual indication can be viewed through the window.

Additional visual indications on the element can provide further information e.g. the state of wear of the brake component, when the dust box should be emptied or the like.

Preferred embodiments will now be described, by way of example only, with reference to the accompanying drawings.

DETAILED DESCRIPTION

An embodiment of the visual indicator for a brake assembly will now be described with respect to the figures. The embodiments described are for a rotary brake system such as used to brake rotation of a helicopter rotor. The concept of the disclosure can, however, be applied to other types of brake system.

Figure 1:
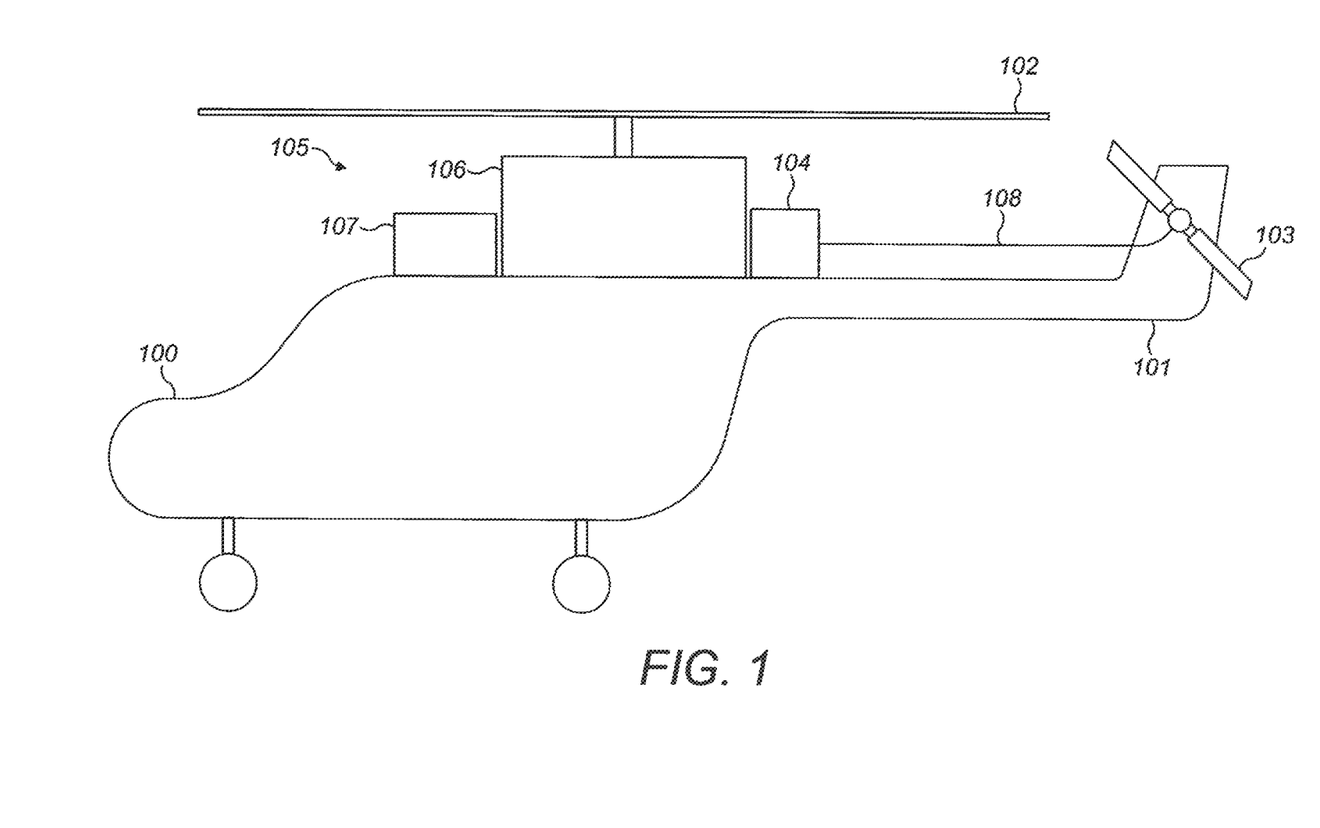
FIG. 1 is a schematic view of a helicopter with a rotor brake.

FIG. 1 shows a schematic view of a rotor brake for a helicopter rotor.

The figure shows the helicopter 100 having a tail 101 and a rotor 102. The tail is also provided with a rotor 103.

A rotor brake 104 is typically mounted in the upper deck area 105 of the helicopter along with other system components e.g. a main gear box 106 and a motor 107. A shaft 108 connects the brake 104 to the tail rotor 103.

The rotor brake assembly is mounted to the tail rotor shaft 108 e.g. via a flexible connection (not shown) and engages with the rotor 102 or other component to be braked, via the main gear box 106.

Figure 2A:
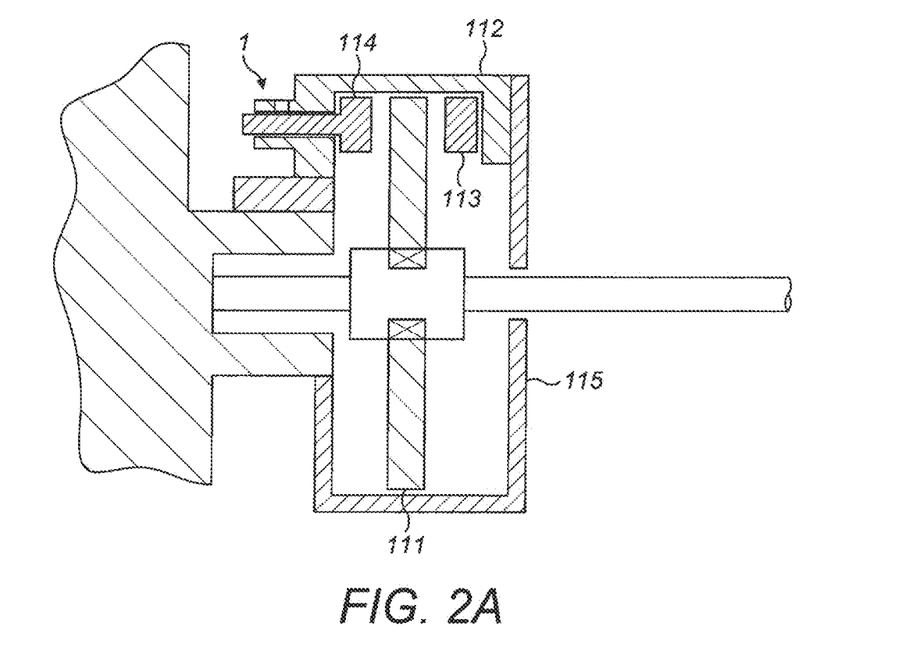
FIG. 2A is a cross-section of a brake assembly incorporating an indicator providing a visual indication that the brake is engaged or released.
Figure 2B:
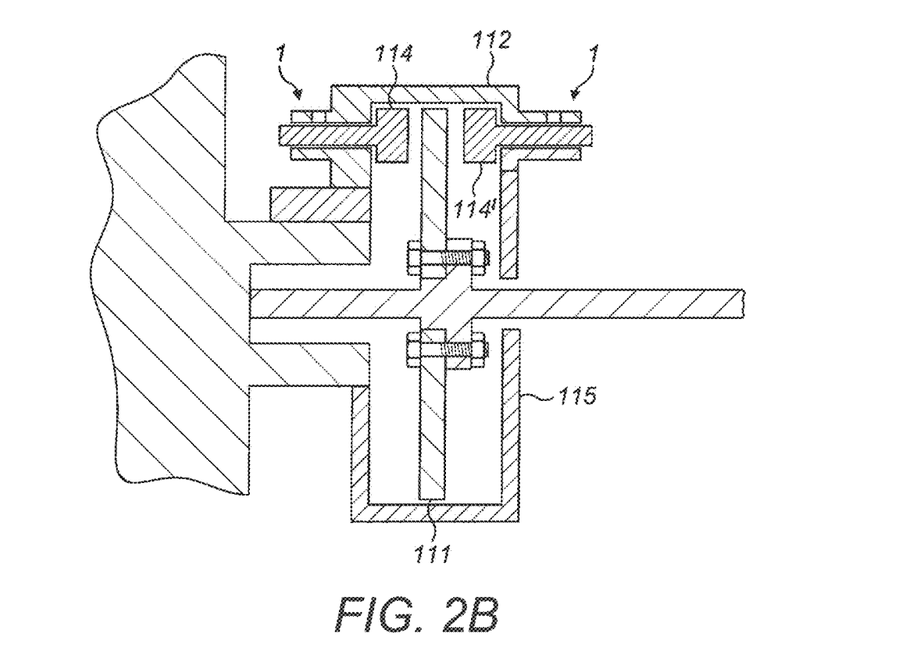
FIG. 2B is a cross-section of a brake assembly incorporating an alternative visual indicator.

FIGS. 2A and 2B are cross-sectional views of a rotor brake 104.

Although described in the context of a helicopter rotor brake, this is not intended to be limiting and such a brake can, of course, have other applications.

The brake assembly comprises a floating disk 111 mounted to rotate with the rotor 102, 103.

A caliper 112 is mounted about the floating disk 111. The caliper 112 comprises brake disks or pads 113, 114 which are, in normal operation, biased to be spaced from the floating disk and which are actuable, in a braking operation, to press against the floating disk 111 to stop it rotating, or to slow its rotation, thus stopping or slowing rotation of the rotors 102, 103.

In the embodiment shown in FIG. 2A, one set of pads 113 is fixed to the caliper cover or support, adjacent one face of the floating disk 111. A second set of pads 114, adjacent the opposite face of the floating disk 111, is moveable relative to the fixed pads 113 e.g. by means of pistons or actuators (not shown), which may be responsive to actuation of a brake lever or control. On braking, the moveable pads 114 are pushed towards the fixed pads 113, squeezing the floating disk 111 between them. In other embodiments (not shown) a pushing plate may be provided to which the moveable pads 114 are mounted, and the pushing plate is moved by the pistons. In other embodiments, as shown in e.g. FIG. 2B, both sets of pads 114, 114' may be moveable.

As mentioned above, conventionally, to contain dust and/or sparks, a dust box 115 is mounted about the brake assembly, encasing the rotor brake 104.

To be able to reliably check the release state of the brake, a visual indicator 1 is, according to the disclosure, provided on the exterior of the brake assembly being monitored. In the event that the brake assembly is encased in a so-called dust box 115, the visual indicator may be mounted on the exterior of the dust box.

The visual indicator includes an indicator element 3 connected to move with a brake component (here the moveable pad 114) being monitored, during braking operation. The indicator element 3 thus moves with the brake disk/pad etc. during braking such that markings or a visual indication can be viewed to provide an indication of the distance and/or direction the indicator element has moved.

Thus, for example, when the brake is released, the indicator element 3 will move in a first direction (to the left in FIG. 2A) and a visual indication thereof will be provided (described further below). When the brake is engaged, the indicator element will move in an opposite direction; in a preferred embodiment, the more the indicator element has to move in this direction to engage the component being braked, to effect braking, the more wear the component has suffered—e.g. if a brake pad or disk is worn, it will be thinner and so have to travel further to engage the component it is braking. The indicator element may be provided with means to indicate this distance as discussed further below.

In the example shown, the indicator element is a rod 3 connected, at one end 8, to the component being monitored (here, pad 114), so as to move with that component during braking. The rod is mounted in a housing 9 with one or more openings or viewing windows 10, 11 for the visual indication.

In the embodiment of FIG. 2B, the brake assembly includes two moveable disk pads 114, 114', each of which may be provided with a visual indicator.

Where the assembly is provided with a dust box, the indicator housing can be mounted on the exterior of the box. Text or graphics may be provided on the housing and/or rod to explain the meaning of the visual indication.

Various visual indications will be described, as preferred embodiments only, with reference to FIGS. 3A to 3E. The description is of a system such as in FIG. 2A but the principle is the same for other types of brake, such as that shown in FIG. 2B.

Figure 3A:
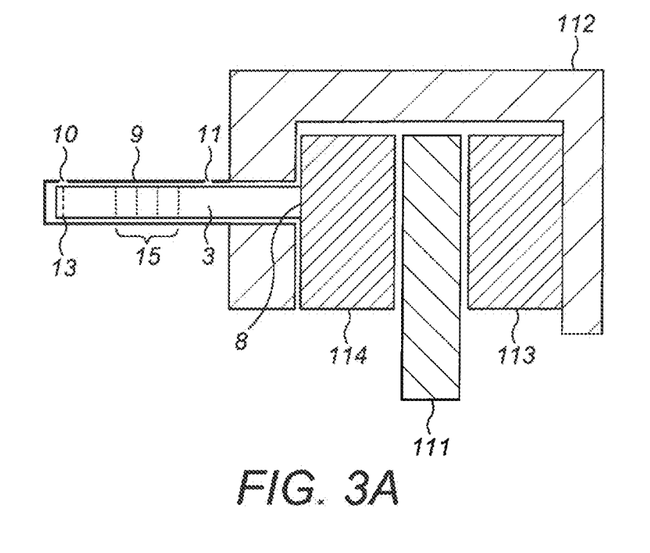
FIG. 3A shows an indicator providing a visual indication that a brake component being monitored is released.

In FIG. 3A, the pads 114, 113 are not, or are hardly, worn and the brake is released—i.e. the pads do not engage the floating disk 111. The visual indicator, here in the form of a rod 3 attached to the moveable pad 114, is provided with markings, the positions of which vary relative to an opening or window 10, 11 depending on the position of the pad 114 relative to the floating disk 111. The rod indicates if the brake is released via an opening or window 10 which, here, is at or near the end of the housing remote from the brake disk/pad. Alternatively, the rod 3 may indicate release by protruding from the end of the housing when the brake is released. This protrusion itself can be an indication of brake release and/or a marking e.g. a coloured marker 13 can be provided on the rod end which is visible beyond the housing or through the window 10 in the housing if the brake is released.

In the embodiment shown, additional markings 15 are provided on the rod to indicate, due to their visibility or not, the degree of wear of the brake pad 114. Here, these markings are positioned on the rod 3 such that they are hidden or not visible through a window or the like e.g. within the indicator housing, if the pad is not worn and if the markings are visible, this indicates worn pads. Alternatively, though, markings could be positioned to be visible to indicate that the pad is not worn and not visible, here through window 11, if the pad is worn, or, e.g., different types or colours of markings could become visible to indicate worn/ not worn and/or different degrees of wear.

Figure 3B:
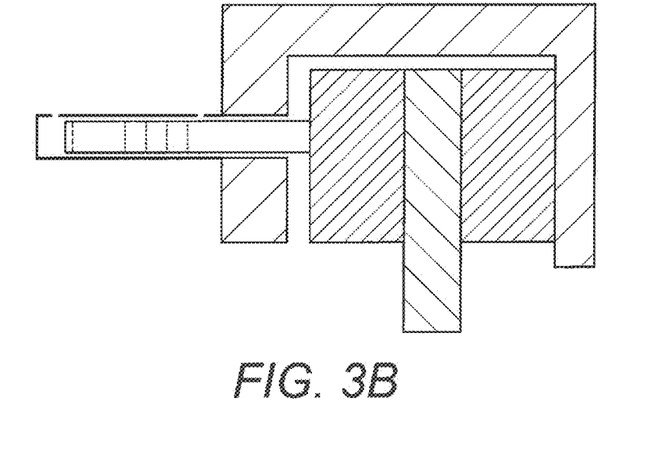
FIG. 3B shows an indicator providing a visual indication that a brake component being monitored is not released.

FIG. 3B then shows the situation where the brake is not released, i.e. is engaged, but there is no problematic wear of the brake disk/pad. Here, the rod 3 does not project beyond the housing (or does not reveal any visual indication through end openings or through window 10) nor does it provide any visual indication through the window 11 at the other end of the housing adjacent the disk/pad 114.

Figure 3C:
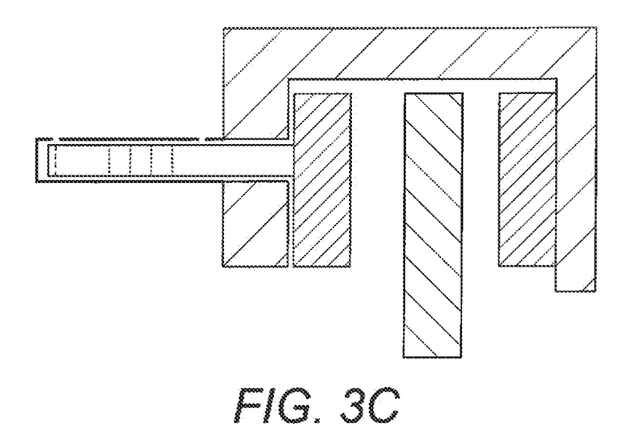
FIGS. 3C and 3D correspond respectively to FIGS. 3A and 3B but for worn brake pads.
Figure 3D:
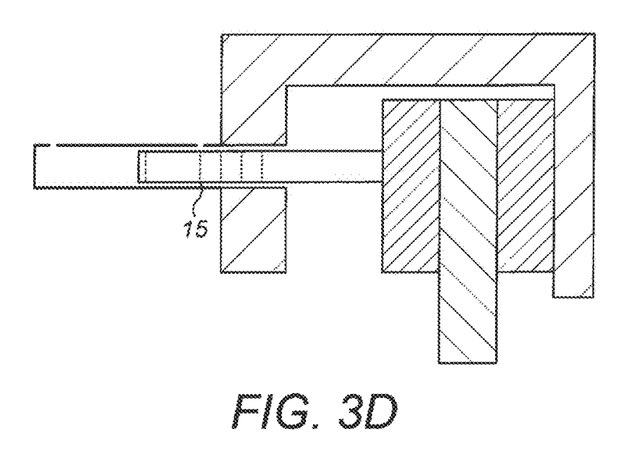

FIG. 3D shows an example of the indication element position when the brake is engaged but the brake disk/pad is worn beyond a given degree. Here, the rod has moved so far to the right of the drawing, with the pad 114, to engage the component 111 to be braked, because the disk/pad is worn thin, such that a 'wear' indicator (here a marking 15 e.g. a coloured marker, is visible through the window 11. This provides an indication to the user that the disk/pad should be replaced. Again, in other embodiments, a marker not being visible may be taken as an indication of a particular state.

FIG. 3C shows the situation for the pad worn as in FIG. 3D, but with the brake released and, thus, the release marker 13 is visible.

Figure 3E:
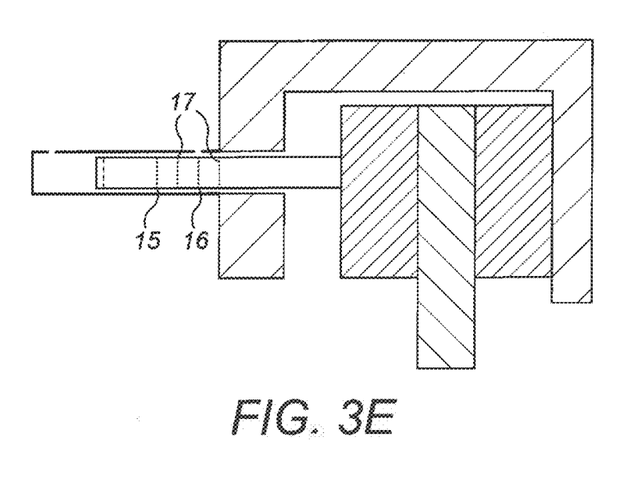
FIG. 3E indicates when a brake pad is partly worn.

In FIG. 3E, movement of the rod has been less extreme in the braking operation, as the brake disk/pad is not so worn, but an intermediate marker 16 is visible through the window. This can provide additional information to the user e.g. of intermediate wear or that the dust box should be cleaned etc. (based on a given degree of wear being an indication that a given amount of brake dust will have accumulated). Other intermediate markings 17 may also be provided for different purposes e.g. to indicate a percentage of remaining disk/pad life, or if dust box cleaning maintenance task is needed.

Figure 5:
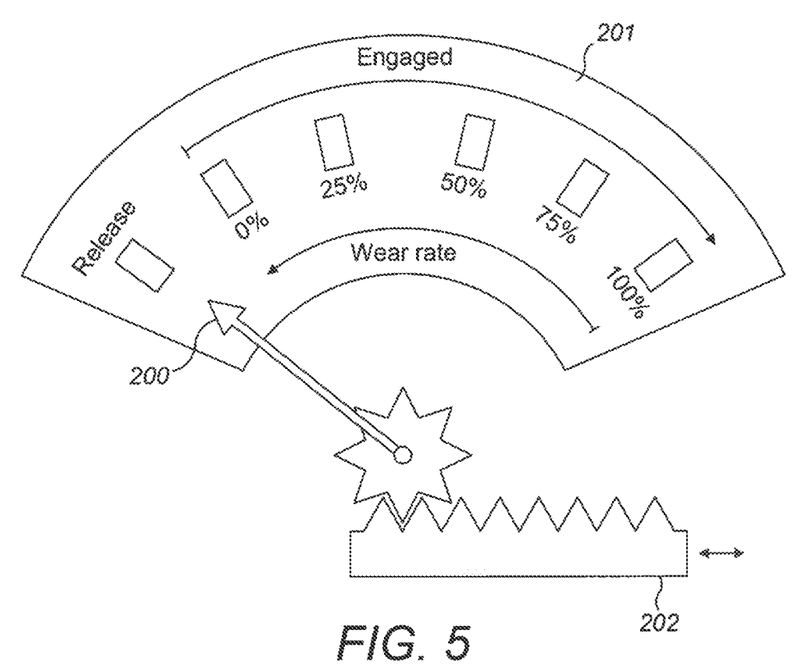
FIG. 5 shows an alternative visual indicator.

This is just one example of how the indicator presents a visual indication of the position of the brake pad 114 relative to, here, the floating disk 111. In another embodiment, as shown in FIG. 5, instead of markings on the rod, the movement of the rod may cause movement of another indicator component such as a needle or disk to provide the required visual indication. Here, the indicator rod, or some means attached to the moveable pad 114, moves a needle 200 or other indicator across a dial 201 or gauge in proportion to movement of the pad. In the example shown, the needle is connected to the rod via a rack and pinion 202. Other types of display might involve movement of a slot or window across a scale or the like to indicate the pad position.

Such an indicator can be provided on any type of braking system where disks/pads move to engage/release the brake, and also where such disks/pads can become worn, whether or not a dust box is in place. The use of a rod and housing is, here, preferred, but the effect can be achieved by any other indicator element configured to provide a visual indication indicative of the length/direction of travel of the brake component to which it is connected.

Figure 4:
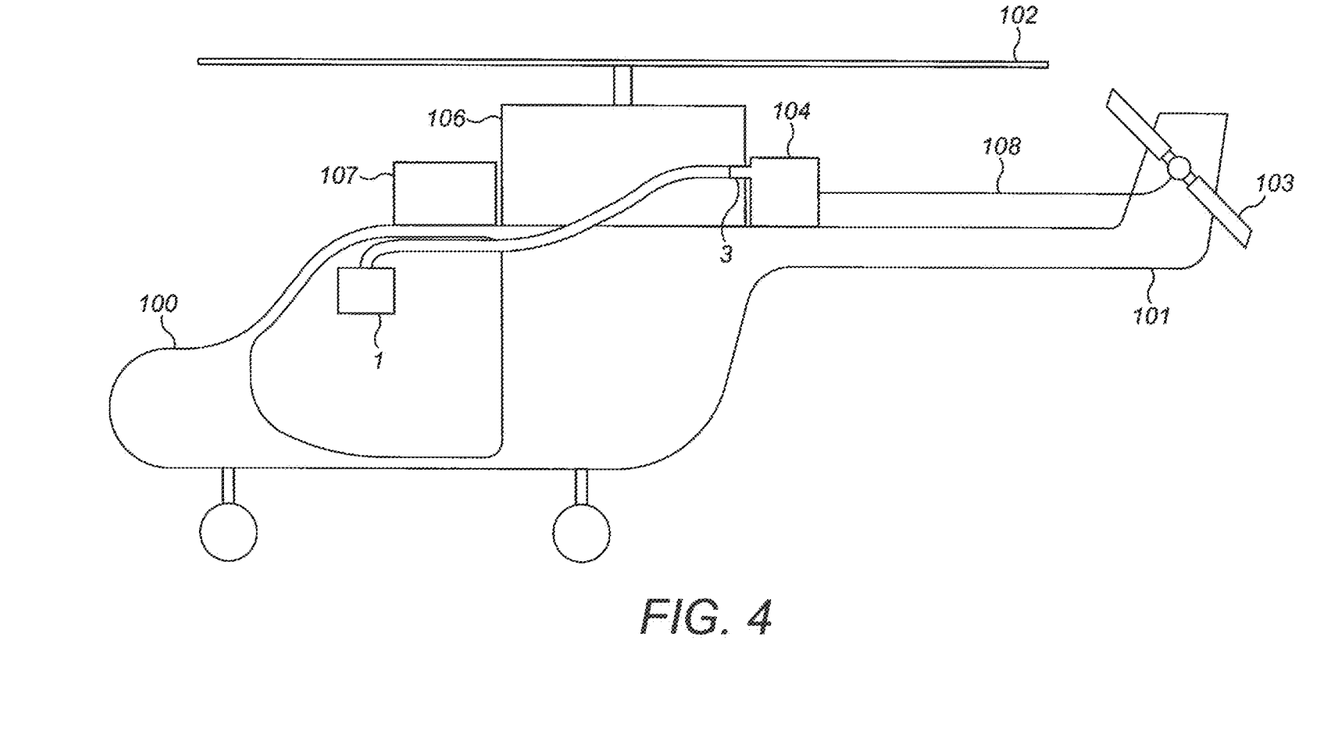
FIG. 4 shows a helicopter as in FIG. 1 but incorporating a visual indicator.

The indicator finds particular application in helicopter rotor brakes that are usually mounted in the top deck as shown in FIG. 4 and are, therefore, enclosed in a dust retainer box. The visual indicator would be located at a position where it can be seen by the crew e.g. in the cockpit. The visual indicator can, however, be advantageous in many other brake applications where it is otherwise difficult to observe the position and/or wear of the brake components.

The invention claimed is:

1. A helicopter rotor brake assembly comprising:
a moving part that moves with a helicopter rotor to be braked,
one or more brake disks or pads actuable to slow movement of the moving part, and
a brake component indicator connected to the one or more brake disks or pad and moveable therewith during a braking operation, configured to provide a visual indication of a release state of the brake disks or pads, and configured to provide a visual indication of the direction or the distance moved by the indicator element during the braking operation;
wherein the indicator is a rod connected to the brake disks or pads that engage the moving part in the braking operation to brake the moving part, the rod provided with indicator means whose position is an indication of the distance and direction the brake disks or pads have travelled in relation to the moving part, providing a first indication when the brake disks or pads are engaged with the moving part and a second indication when the brake disks or pads are disengaged from the moving part, and wherein the first indication includes an indication of the distance the brake disks or pads have travelled to engage the moving part;
wherein the rod is moveably mounted in a housing having a plurality of windows;
wherein movement of the rod causes movement of the plurality of markers relative to the plurality of windows; and
wherein the first and second indicators are provided by predetermined alignment of markers and windows.

* * * * *